Dec. 9, 1969     G. H. RICHARDSON ET AL     3,482,507
APPARATUS FOR THE CONTINUOUS PRODUCTION OF CHEESE CURD
Original Filed Jan. 3, 1964                   2 Sheets-Sheet 1

INVENTORS.
GARY H. RICHARDSON
BY EDMUND H. CORNWELL
E.T. McCabe
ATTORNEY.

Dec. 9, 1969   G. H. RICHARDSON ET AL   3,482,507
APPARATUS FOR THE CONTINUOUS PRODUCTION OF CHEESE CURD
Original Filed Jan. 3, 1964   2 Sheets-Sheet 2

INVENTORS.
GARY H. RICHARDSON
BY EDMUND H. CORNWELL
E.T. McCabe
ATTORNEY.

United States Patent Office 3,482,507
Patented Dec. 9, 1969

3,482,507
APPARATUS FOR THE CONTINUOUS
PRODUCTION OF CHEESE CURD
Gary H. Richardson, Waukesha, Wis., and Edmund H. Cornwell, Oak Lawn, Ill., assignors to Swift & Company, Chicago, Ill., a corporation of Illinois
Original application Jan. 3, 1964, Ser. No. 335,592, now Patent No. 3,394,011, dated July 23, 1968. Divided and this application Oct. 2, 1967, Ser. No. 677,826
Int. Cl. A01j 25/11
U.S. Cl. 99—243                                      5 Claims

ABSTRACT OF THE DISCLOSURE

A coagulum of cheese and whey is prepared by mixing the ingredients in an agitating zone and continuously flowing same through a heating zone where the coagulum is heated by the application of an electrical current. The electrical current passing through the coagulum causes the curd to increase in temperature whereby it contracts and expels liquid. An endless plurality of sweeping means moves moves the heated coagulum through the heating zone and discharges quantities of curd upon endless conveyors where such quantities are inverted and further processed.

---

This application is a division of our co-pending application S.N. 335,592, filed Jan. 3, 1964, now U.S. Patent No. 3,394,011.

This invention relates to improvements in the manufacture of cheese and, more particularly, to an improved, rapid, and continuous method for producing cheese curd and improved curd manufacturing apparatus.

The conventional method for producing cheese curd which has been practiced for a long period of time involves adding a culture to milk, holding the milk-culture mixture at a suitable temperature to promote ripening, and at the end of the ripening period adding rennet to the mixture to form a coagulum made up of curd and whey. The coagulum is then cut into cubes and the temperature of the mass is raised to aid in shrinking the curd, thus facilitating separation of the curd from whey. This procedure requires considerable time and the production of good texture cheese curd generally takes around 2½ to 3 hours, utilizing prior art procedures.

Significant improvements have recently been made in curd manufacturing procedures and particularly important improvement is described in co-pending patent application S.N. 103,955, filed Apr. 14, 1961, now U.S. Patent No. 3,079,263, by H. G. Foster and E. H. Cornwell. The rapid and continuous curd-forming procedure disclosed in the application represents a substantial departure from conventional cheese curd manufacturing procedures in that it is possible by following the method disclosed in the co-pending application to produce curd in 1½ hours, whereas prior methods require as much as 3 hours to obtain similar results.

The rapid, continuous process disclosed in the aforementioned co-pending application involves treating milk with a proteolytic enzyme such as rennet for a time sufficient to convert the milk protein to paracasein, but insufficient to cause digestion or hydrolysis of the protein, and then adding a food acid to the mixture to form a coagulum. The curd is separated from the whey by centrifugation or other suitable means. Variations in the method, such as the use of starter culture, the use of various proteolytic enzymes and diverse food acids, are all envisioned in the process described in the co-pending patent application.

While the continuous manufacturing method referred to has been found to be highly advantageous and provides substantial economic advantages insofar as simplicity of the equipment required is concerned and, also, with respect to the substantial increase in production rate for a given sized manufacturing plant, further and important improvements in the method have been developed and these improvements are described, in detail, hereinafter.

Specifically, after the coagulum is formed, it is desirable to heat the curd to cause the protein to shrink and release the liquid contained in the curd. Cooking of the curd and whey has been employed in the past to aid in more complete separation of the liquid and solid portions. Other methods, such as centrifugation, have also been employed to separate the curd from the whey, and while these procedures have been more or less satisfactory, they possess inherent shortcomings. Both conventional cooking and centrifugation are somewhat slower operations than are desired in a continuous method, and the amount of liquid removed from the curd by these techniques is limited by the centrifuging time or the time and temperature of heating. In addition, conventional cooking involves the heating of the entire curd-whey mixture and care must be exercised to insure that the heating temperature or heating time is not excessive or "burned on" or charred portions of the mixture will be deposited on the sides of the cooking vessel. Moreover, because of the lack of uniformity in heating when curd-whey mixtures are heated by known procedures, the curd is often firm on the surface, but the inner portion of the curd particles is soft and wet. Again, because of the nonuniformity of heat distribution, some parts of the curd are heated to a substantially higher temperature than other portions and fat is rendered from the curd and is found in the whey portion. These condiditions are noted particularly where live steam is injected into the curd-whey mixture or where the curd-whey mixture is passed through pipes which are jacketed with a hot water heat transfer device.

It is, accordingly, an object of this invention to provide an improved method for separating curd from whey in a coagulum.

Another object of the invention is to provide a cheese manufacturing apparatus adapted to the rapid and continuous manufacture of cheese curd.

Still another object of the invention is the provision of a method and apparaatus for promoting separation of cheese curd from whey and simultaneously and uniformly heating said curd to release liquid from the curd.

Additional objects of the invention, if not specifically set forth herein, will be readily apparent to those skilled in the art from the detailed description of the invention which follows.

Generally, the invention includes apparatus for continuously forming cheese curd and separating the curd from the whey in an improved, rapid manner so as to provide a firm, uniform curd, well adapted to the subsequent cutting into cubes, salting, pressing, curing, and grinding operations. Also provided is a method and means for simultaneously and uniformly heating cheese curd in a curd-whey mixture whereby to shrink the curd and express or expel the liquid from the curd. This uniform heating conditions the curd so as to permit more complete and efficient separation of the curd from the liquid solution of whey. Although the invention has particular application to the rapid, continuous curd-producing procedure described in the aforementioned copending application, it can also be employed in the treatment of curd-whey mixtures formed by other less rapid or batch methods to insure improved curd production in a more rapid and efficient manner.

More particularly, the invention involves the exposure of a curd-whey mixture to a heating cycle wherein the curd and whey are subjected to simultaneous and uniform heat. In the preferred form of the invention, the curd-whey mixture is passed through a heating zone, where the mixture is heated by electrical heating. It is, thus, possible by applying a moderate electrical voltage across the curd-whey mixture to coagulate the curd and produce a tighter curd more rapidly than is possible by conventional heating means. The resistance presented by the curd as it passes the electrical source is substantial and the curd contracts resulting in expulsion of the liquid from the mass of the curd.

The improved curd shrinking and curd-whey separating method is of particular utility in the continuous production of curd since it is possible to provide, in combination, apparatus adapted to permit introduction of cheese-forming ingredients in one end and initiate a continuous flow of ingredients through the apparatus, resulting in good quality, firm curd product at the downstream end of said apparatus. Thus, cheese-forming ingredients are continuously fed into the apparatus and high quality curd substantially free of whey is continuously produced in a short period of time. The apparatus described hereinafter is capable of handling about 10,000 pounds of milk per hour input, with the production of curd at the rate of about 1,000 pounds per hour. Larger and smaller devices will, of course, produce proportionately greater and smaller quantities of curd.

FIGURE 3 is a diagrammatic view of the apparatus, including the assemblage of take-off and dryer conveyors.

FIGURE 4 is a cross-sectional view of the paddles 32 of FIGURE 1.

Figure 1:
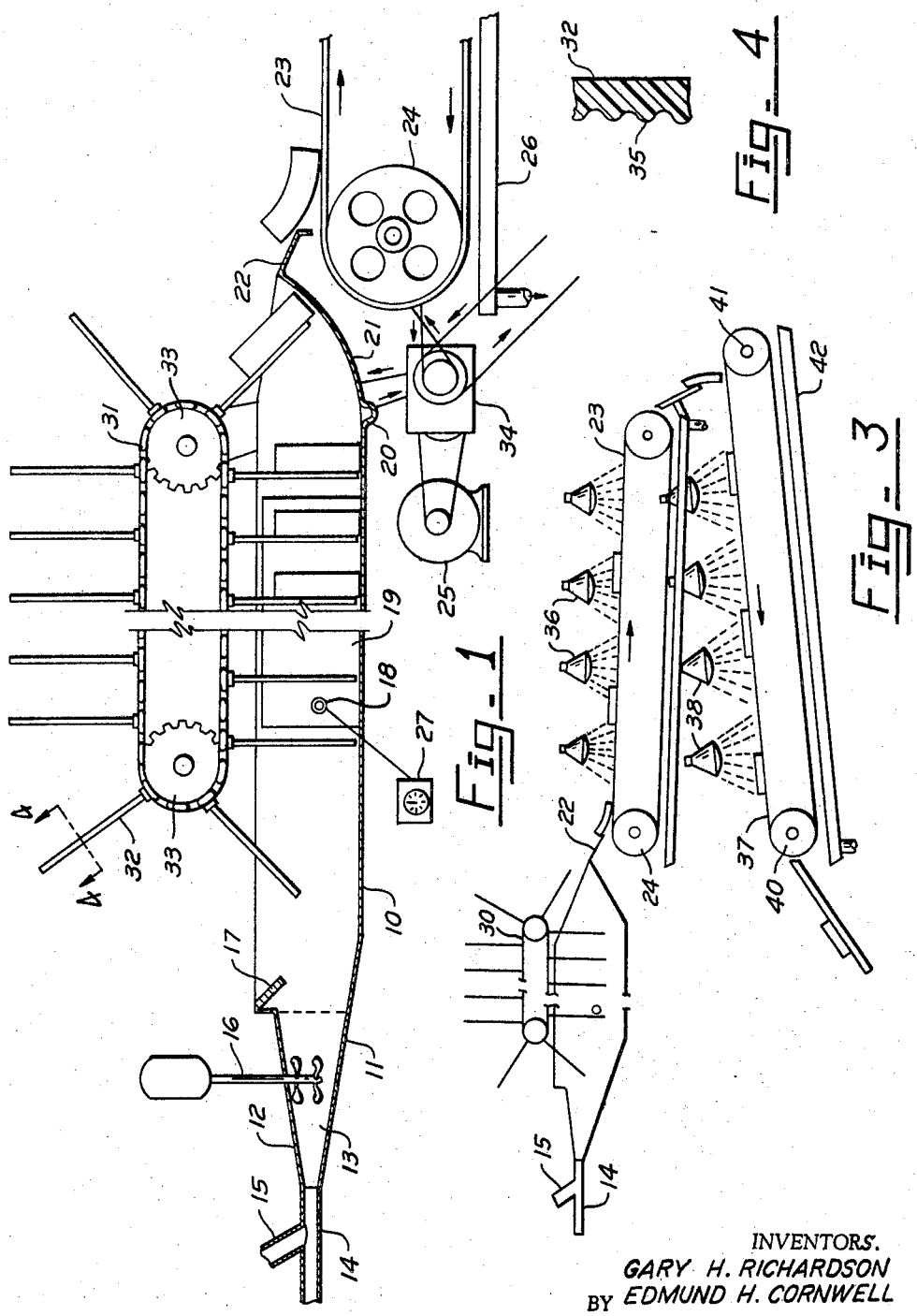
FIGURE 1 is a side view, partly in section, of a device suitable for use in the invention.

The apparatus of FIGURE 1 is made up of an elongated container 10, open at the top, which is constructed of a material having a high dielectric value and good strength such as glass or filled plastic. The bottom of the container at the forward or feed end is inclined as at 11 to form with an inclined top section 12 an enclosed mixing section 13 into which is introduced milk, acid, enzyme, and starter culture as required. A feed conduit 14 for the introduction of food acid and milk is attached to the mixing section. An enzyme supply means is provided by conduit 15, forming a Y connection with the milk supply means. An agitator 16 is located in the mixing zone and the agitator, which can be a simple stirring motor, extends into the tank or container so that the stirrer efficiently mixes the contents of the tank. A baffle 17 is attached across the top of the tank to minimize loss of liquid. Electrodes 18 are attached to a variable power source 27 and are fitted into plates 19 opposite sides of the tank. The plates are preferably constructed of stainless steel or other equivalent metal. The power source should provide around 220 volts D.C. and about 45 kilowatts per hour. The tank or trough is also equipped with a liquid removal means represented by a valve 20 which, like the tank, is made of a nonconductive plastic or equivalent material.

The discharge end of the tank represented generally at 21 is dish-shaped to aid in removal of curd from the tank and is equipped with a transfer apron 22 which extends across the end of the tank. The take-off conveyor constructed of an endless wire mesh belt 23 passes over drums or pulleys 24. A drip pan 26 is located beneath the conveyor to permit liquid draining through the wire mesh to be recovered.

A paddle conveyor generally 30 is located above the tank and is made up of an endless belt 31 and several paddles or sweeps 32 fastened to the belt and disposed perpendicular to the surface of the belt. The paddles are of sufficient length so that they extend into the tank to a depth just short of the bottom of the tank. The paddles, like all other elements coming in contact with the tank or the contents thereof, are of a nonconductive plastic such as Teflon. The width of the paddles is slightly less than the width of the tank and the paddles are located preferably about ¼–⅜ inch apart, if it is desired to simulate the wires in a conventional cheese knife. The distance between the paddles or dividers can be greater or less as desired. The belt carrying the paddles is driven by drums or pulleys 33, one of which is attached to the power source. The back or trailing face of the paddles may contain many small protuberances 35 to assist the paddles to pull free from the curd and aid in the drainage of the whey from the curd. These protuberances are more clearly illustrated in FIGURE 4.

Figure 2:
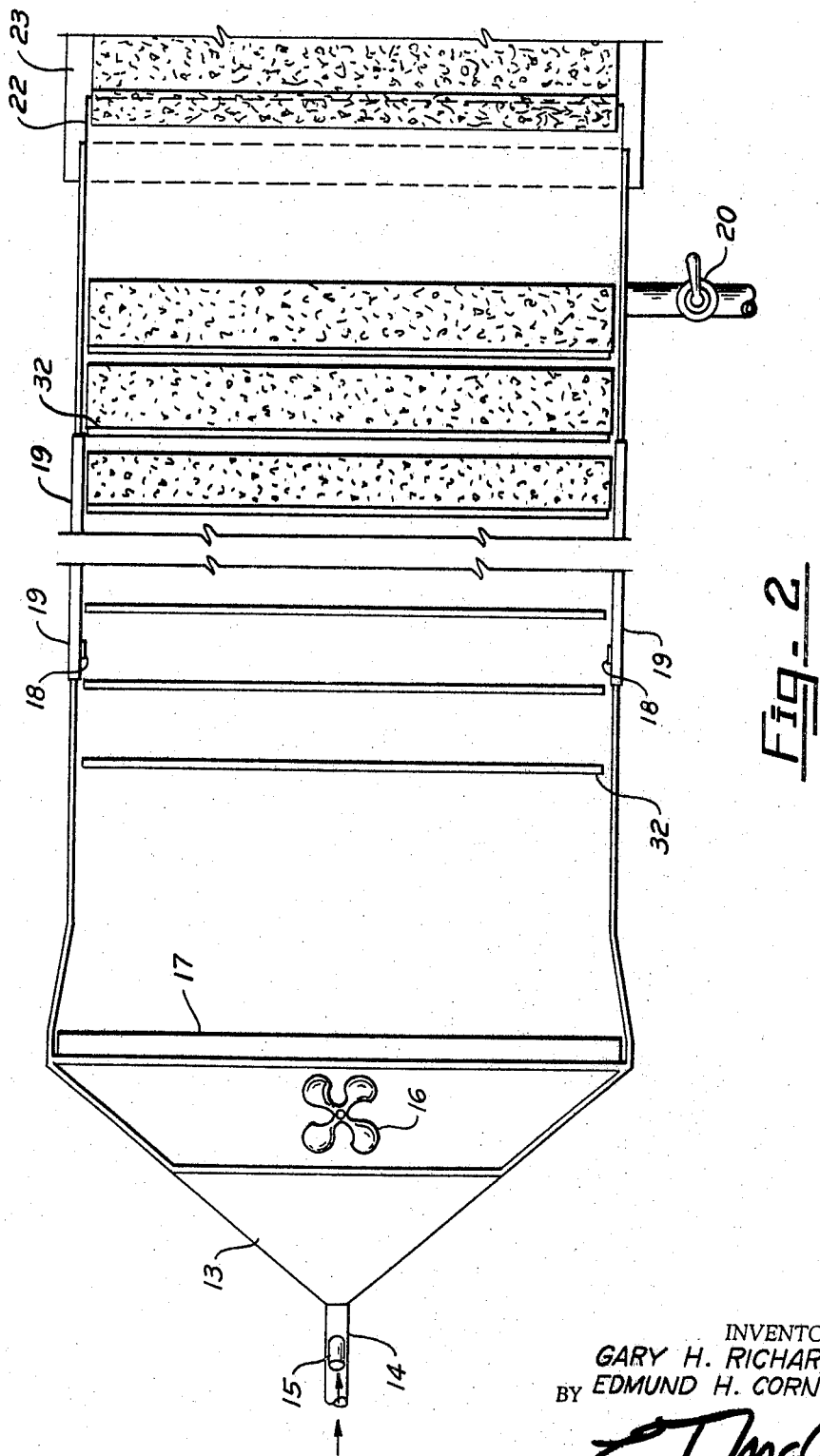
FIGURE 2 is a plan view of the apparatus shown in FIGURE 1, with the sweep conveyor omitted.

In the plan view illustrated in FIGURE 2, where like numbers refer to like parts shown in FIGURE 1, the positioning of the paddles and the path of movement of the paddles through the tank is more easily seen. In addition, the positioning of the electrodes is apparent. Similarly, it will be noted that the width of the take-off and dryer conveyor is slightly greater than the width of the tank to guard against loss of curd. The gathering of curd and the passage of electrical energy transverse to the movement of gathered curd is apparent from this figure.

FIGURE 3 illustrates in greater detail the system used to recover and dry the curd emanating from the curd-forming container. The take-off wire mesh conveyor 23 is shown, as in FIGURE 1, and heat lamps 36 are located above the conveyor to dry the curd. Inclined, endless conveyor 37 is also of the wire mesh type and the conveyor is subjected to heat from heat lamps 38. Conveyor 37, like the take-off conveyor, is driven by drums or pulleys 40 and 41. The latter drum is connected to the power source. The combination of the two dryer conveyors is operated so as to subject, first, one side and then the other side of the cheese curd mass to heat provided by the heat lamps. Conveyor 37 is operated at a speed about twice that of conveyor 23. The speed of conveyor 23 is for best results about 20% greater than the speed of the paddle conveyor. With this arrangement, it is possible to insure that the relatively flat mattes of curd will be deposited on the take-off conveyor and the position and speed of the take-off and dryer conveyors insures that one surface of the slab or matte is exposed to the heat lamps during travel along conveyor 23 and the matte will then be inverted to expose the reverse side of the slab or matte to heat. The lamps can be conventional 250 watt heat lamps or equivalent. Other means for heating the curd to remove water therefrom can also be employed. Conveyor 37 is equipped with a drip pan 42 for recovery of liquid passing through the conveyor.

Although it is possible to provide separate motors for driving each of the conveyors a very convenient device for driving all conveyors is provided by motor 25 and speed reducer 34. Thus rotation of each of the drums or pulleys for the paddle conveyor 31, the take-off and drying conveyor 23 and drying conveyor 37 is provided by a single motor and speed reducer assembly. In one embodiment of the invention the paddle conveyor moves at about 10 feet per minute and the first take-off and dryer conveyor moves at about 12 feet per minute while the second dryer conveyor moves at about 14 feet per minute.

In operation, milk, either pasteurized or nonpasteurized as desired, is warmed to a temperature in the range of about 85–130° F., in the present instance, about 105–110° F. and about 0.25–1.5% by weight of the milk of an aqueous 10% rennet solution is introduced into the mixing section of the tank. The mixture is vigorously agitated in the mixing zone and the flow through the tank toward the electrical heating system is quiescent. Flow of the mixture at this point is largely a result of the pressure exerted by the incoming ingredients. A light coagulum starts to form almost immediately and by the time the milk, enzyme and acid mixture comes within the area of the sweep of the paddle conveyor, curd is forming in good quantity. Passage of the solution through the tank can be adjusted to the requirements of the particular milk, enzyme and acid being employed. A flow rate of about 5–10 feet per minute has been found very satisfactory although the flow rate can be varied considerably with larger apparatus having a large number of heating stations. As the curd-forming mixture reaches the area of the paddle conveyor, the paddles or sweeps gather the forming curd and each sweep or paddle moves the curd at a uniform rate through the tank. The width of the paddles is such that there is approximately $\frac{1}{16}$ inch clearance from the walls of the tank.

As the paddles drag or convey the forming curd through the tank, the curd is carried through the path of electrical current provided in the sides of the tank. The effect of the heating cycle is to cause the curd to shrink and expel entrapped water therefrom. The curd is then uniformly firm and contains no apparent soft spots. The temperature of the curd is raised to about 110–115° F. during the passage through the electrical heating zone and this temperature rise seems to be well suited to excellent curd-whey separation. No overcooking or under cooking is observed since the curd is moved at a uniform rate into intersection with and through the heating zone. Curd temperature can in some instances be increased to as much as 120° F. but the curd must not be exposed to temperatures much above about 120° F. unless the holding time at that temperature is very short. In those cases where it is desired that the conventional lactic acid bacteria not be killed as when a culture is to be allowed to grow after matting of the curd attainment temperature of the curd should not be allowed to exceed about 104° F.

The sweeps deposit slabs or sheets of firm curd on the take-off conveyor and this conveyor transports the slabs beneath a bank of heat lamps to a second mesh conveyor also exposed to a tank of heat lamps. The slabs are inverted in the transfer from the first to the second take-off conveyor so that the final product is a uniformly firm curd substantially free of whey.

As has been mentioned previously, it is possible to equip the tank or trough with more than one set of electrodes to provide more than one heating zone. Further, since the voltage is variable, it is possible to adjust the amount of voltage passing through the curd carried through the electrical heating area and, thus, adjust the temperature to which the curd is heated to any desired degree. Similarly, the curd drying section of the apparatus can be varied and a drying tunnel or other suitable drying apparatus can be employed. The ingredients and order of addition of ingredients can also be varied. While in the preferred form, acidified milk is pumped into the feed conduit and enzyme is metered into the milk through a T connector, it is also possible to meter acid into sweet milk before or after the rennet or, in some instances, acid can be eliminated entirely. Another embodiment involves the use of acid along without using enzyme. It is possible to introduce a cold acidified milk mixture into the apparatus and heat to coagulate the mixture. Such an alternative may be used particularly in the manufacture of cottage cheese curd.

Obviously, many modifications and variations of the invention as hereinbefore set forth may be made without departing from the spirit and scope thereof.

We claim:
1. In a cheese curd processing apparatus wherein curd-forming ingredients are admixed and delivered to an electrical resistance heating means, the combination comprising: a container formed of an electrical nonconductor having electrical heating means adapted to impress a voltage within the confines of said container, means for conveying a liquid curd-whey suspension through said container in a path intercepting said electrical voltage whereby to elevate the temperature of said curd by resistance heating and means for continuously removing heated curd from said container.

2. Apparatus for the continuous manufacture of cheese cured comprising: an elongated curd-forming and cooking container, feeding means at the forward end of said container for introducing curd-forming ingredients into said container, mixing means for mixing said curd-forming ingredients whereby to form a curd-whey suspension, curd gathering and conveying means adapted to gather said curd and move said cured through said container from said forward end of said container to the discharge end thereof, electrical heating means associated with said container to produce a voltage inttersecing the path of movement of said curd to substantially instantaneously heat all portions of said curd, and means for continuously removing cooked curd from said container.

3. Apparatus for continuously cooking cheese curd in a curd-whey mixture comprising: an elongated container having a feed end and a discharge end, means for continuously introducing a curd-whey mixture into said feed end, means for gathering said curd and moving said curd through said container toward the discharge end thereof, means for impressing an electric voltage across the path of movement of said curd in said container whereby to cause said curd to be uniformly heated and means for removing said heated curd from said container.

4. An improved device for the continuous production and cooking of cheese curd comprising: means for passing milk and acid through a conduit, means for metering proteolytic enzyme into the milk and acid in the conduit to form a curd-whey mixture, means for passing the curd-whey mixture into a heating zone, means for aggregating the curd into slabs in the heating zone, means for passing an electric current through said slabs in the heating zone whereby to substantially simultaneously and uniformly heat all portions of said curd, and means for removing said curd from said heating zone.

5. An improved device for continuously cooking cheese curd comprising: means for introducing cheese-forming ingredients, including milk, acid, and proteolytic enzyme, into an elongated container having a feed end and a discharge end, a paddle conveyor located above said container having a series of cleats mounted on said conveyor, the path of said cleats being such that said cleats extend into and pass through said container from said feed end to said discharge end, said paddles being arranged to gather curd in the form of mats and urge said mats through said container, a pair of electrodes located in said container to pass an electric current across said container, intersecting the path of movement of said slabs whereby said slabs are heated by resistance heating, and take-off means at the discharge end of said container to receive cooked curd mats from said container.

References Cited

UNITED STATES PATENTS

| 1,900,573 | 3/1933 | McArthur | 99—212 X |
| 2,608,638 | 8/1952 | Daiger. | |
| 3,235,388 | 2/1966 | Francis | 99—109 |

HUGH R. CHAMBLEE, Primary Examiner

U.S. Cl. X.R.

31—46